(12) United States Patent
Mirbach et al.

(10) Patent No.: US 12,510,670 B2
(45) Date of Patent: Dec. 30, 2025

(54) METHOD FOR DEPTH MEASUREMENT WITH A TIME-OF-FLIGHT CAMERA USING AMPLITUDE-MODULATED CONTINUOUS LIGHT

(71) Applicant: IEE INTERNATIONAL ELECTRONICS & ENGINEERING S.A., Echternach (LU)

(72) Inventors: Bruno Mirbach, Konz (DE); Martin Boguslawski, Trier (DE); Thomas Solignac, Luttange (FR)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 1166 days.

(21) Appl. No.: 17/430,671

(22) PCT Filed: Feb. 14, 2020

(86) PCT No.: PCT/EP2020/053915
§ 371 (c)(1),
(2) Date: Aug. 12, 2021

(87) PCT Pub. No.: WO2020/165416
PCT Pub. Date: Aug. 20, 2020

(65) Prior Publication Data
US 2022/0128692 A1    Apr. 28, 2022

(30) Foreign Application Priority Data
Feb. 15, 2019    (LU) .................................. LU101130

(51) Int. Cl.
*G01S 17/32* (2020.01)
*G01S 7/4914* (2020.01)
(Continued)

(52) U.S. Cl.
CPC ............ *G01S 17/32* (2013.01); *G01S 7/4914* (2013.01); *G01S 7/4915* (2013.01); *G01S 7/493* (2013.01); *G01S 17/894* (2020.01); *H04N 25/46* (2023.01)

(58) Field of Classification Search
None
See application file for complete search history.

(56) References Cited

U.S. PATENT DOCUMENTS 9,451,141 B2 * 9/2016 Kadambi ............. H04N 5/2226
10,838,062 B2 * 11/2020 de Mersseman ....... G01S 7/486
(Continued)

FOREIGN PATENT DOCUMENTS

DE    102015105161 A1    10/2015
EP    2966475 A1    1/2016

OTHER PUBLICATIONS

International Search Report corresponding to International Application No. PCT/EP2020/053915, dated Apr. 28, 2020, 4 pages.
(Continued)

*Primary Examiner* — Luke D Ratcliffe
(74) *Attorney, Agent, or Firm* — Reising Ethington P.C.

(57) ABSTRACT

A method for depth measurement with a time-of-flight camera using amplitude-modulated continuous light by acquiring for each of a plurality of pixels of a sensor array of the camera at least one sample sequence having at least four amplitude samples ($A_0$, $A_1$, $A_2$, $A_3$) at a sampling frequency higher than a modulation frequency of the amplitude-modulated continuous light. The method further includes: determining for each sample sequence of each pixel a confidence value (C) indicating a degree of correspondence of the amplitude samples ($A_0$, $A_1$, $A_2$, $A_3$) with a sinusoidal time evolution of the amplitude; and determining for each of a plurality of binning areas, each of which comprises a plurality of pixels, a binned depth value ($D_b$)

(Continued)

based on the amplitude samples ($A_0$, $A_1$, $A_2$, $A_3$) of sample sequence of pixels from the binning area, wherein the contribution of a sample sequence to the binned depth value ($D_b$) depends on its confidence value (C).

14 Claims, 8 Drawing Sheets

(51) Int. Cl.
    *G01S 7/4915*     (2020.01)
    *G01S 7/493*     (2006.01)
    *G01S 17/894*     (2020.01)
    *H04N 25/46*     (2023.01)

(56) References Cited

U.S. PATENT DOCUMENTS

| | | | |
|---|---|---|---|
| 2015/0294142 A1 | 10/2015 | Gruenwald | |
| 2017/0212228 A1* | 7/2017 | Van Nieuwenhove | G01S 17/894 |
| 2020/0301014 A1* | 9/2020 | Schoenlieb | G01S 17/36 |
| 2021/0358148 A1* | 11/2021 | Mirbach | G06T 7/80 |
| 2022/0252729 A1* | 8/2022 | Ortiz Egea | G01S 7/493 |
| 2022/0291362 A1* | 9/2022 | Strepp | G01S 17/894 |

OTHER PUBLICATIONS

Written Opinion corresponding to International Application No. PCT/EP2020/053915, dated Apr. 28, 2020, 9 pages.

\* cited by examiner

METHOD FOR DEPTH MEASUREMENT WITH A TIME-OF-FLIGHT CAMERA USING AMPLITUDE-MODULATED CONTINUOUS LIGHT

TECHNICAL FIELD

The invention generally relates to a method for depth measurement with a time-of-flight camera using amplitude-modulated continuous light.

BACKGROUND

Time-of-flight cameras are used to provide pixelwise depth information in an image of a three-dimensional object or scenery. The camera comprises a (normally two-dimensional) sensor array with a plurality of pixels. Each pixel provides information from which the depth (i.e. the distance from the camera) of a recorded point in space can be derived. Apart from TOF cameras using light pulses, another type of TOF camera uses an amplitude-modulated continuous light. In other words, the camera emits a continuous field of amplitude-modulated light, which is reflected from objects in the field of view of the camera. The reflected light is received by the individual pixels. Due to the amplitude-modulation, the phase of the received light can be deduced from the amplitude, and by the relative phase difference, the time-of-flight and thus the distance to the reflecting object can be determined. According to a well-known method, lock-in pixels are employed where the readout of each pixel is synchronized to the modulation frequency of the light. In particular, the readout frequency of each pixel can be 4 times the modulation frequency. This is also referred to as the 4-tap method. It is based on receiving and evaluating four consecutive amplitude samples at four consecutive points in time, each time interval corresponding to a 90° phase shift. Each amplitude measurement can be referred to as a tap.

A potential issue with the 4-tap method is that an object can move during the measurement. Thus, the amplitude samples detected for consecutive taps can correspond to different actual depths, e.g. the depth of a moving object in the foreground and the depth of the background. If, for example, the motion of the object has a component perpendicular to the optical axis of the camera, a given pixel may correspond to a part of the object at one tap and may correspond to a part of the background at the next tap, or vice versa. This problem can occur for pixels near the edge of the object in the image and often leads to wrong and unexpected depths. This can also occur if the object only moves away or towards the camera, due to the stretching or shrinking perceived by the camera, wherefore pixels near the edge may also change between object and background. This effect is also known in the literature as "flying pixels".

EP 2 966 475 A1 discloses a method for binning TOF data from a scene, for increasing the accuracy of TOF measurements and reducing the noise therein, the TOF data comprising phase data and confidence data. According to the method, a plurality of TOF data are acquired by illuminating the scene with a plurality of modulated signals and each modulated signal is associated with a vector defined by a phase and a confidence data, respectively. The plurality of vectors are added for obtaining a binned vector and the phase and confidence data of the binned vector are processed for obtaining depth data of the scene. According to the description, the "confidence" corresponds to the amplitude of a reflected signal.

DE 10 2015 105 161 A1 discloses an apparatus for detecting a motion of an object in a target space, wherein the object is located at a distance from an image-capturing device configured to measure the distance and to provide a sensor signal indicative of the distance, the sensor signal being decomposable in a decomposition comprising odd harmonics if the object is at rest. The apparatus comprises a determining circuit configured to receive the sensor signal and to generate at least one motion signal based on at least one even harmonic of the decomposition of the sensor signal, and a detection circuit configured to detect the motion of the object based on the at least one motion signal and to provide a detection signal indicating the motion of the object. The image-capturing device is configured to capture an image comprising a plurality of pixels, and wherein the determining circuit is configured to receive the sensor signal and to generate the motion signal for each pixel of the plurality of pixels without relying on neighboring pixels of the plurality of pixels.

SUMMARY

It is thus an object of the present invention to enable an accurate and efficient depth measurement with a time-of-flight camera.

This problem may be solved by a method according to claim 1.

In at least some embodiments, the invention provides a method for depth measurement with a time-of-flight camera using an amplitude-modulated continuous light. Depth measurement herein of course refers to measuring the distance from the camera, so that a 3D image can be obtained. The principle of a time-of-flight (TOF) camera using amplitude-modulated continuous light is well known as such and has been explained above. While the term "light" may refer to visible light, it will be understood that infrared light or ultraviolet light could be employed as well.

In a first step, the method comprises acquiring, for each of a plurality of pixels of a sensor array of the camera, at least one sample sequence comprising at least four amplitude samples at a sampling frequency higher than a modulation frequency of the amplitude-modulated continuous light. The pixels may in particular be lock-in pixels. The sensor array comprises a plurality (normally between several hundred and several thousand) of pixels, usually disposed in a two-dimensional pattern, although a one-dimensional arrangement would be conceivable, too. The sample sequence comprises at least four amplitude samples that are sampled at a sampling frequency that is higher than a modulation frequency of the amplitude-modulated continuous light. In particular, the sampling frequency may be an integer multiple of the modulation frequency. The amplitude samples normally correspond to the amplitude of a correlation function between an emitted signal and a received signal. For a pixel corresponding to the surface of a stationary object, the correlation function should be sinusoidal, i.e. it should correspond to a sine function (or cosine function, respectively) having a normally nonzero phase shift.

In another step of the method, a confidence value is determined for each sample sequence of each pixel indicating a degree of correspondence of the amplitude samples with a sinusoidal time evolution of the amplitude. There are various ways how the confidence value can be determined, some of which will be discussed below. Normally, the confidence value is defined so that it is high for a high degree of correspondence and low for a low degree of correspondence. This method step is based on the assumption that for a stationary object, the amplitude samples should correspond to a sinusoidal function. According to various factors like measurement errors or the like, the amplitude samples will normally not correspond fully with a sinusoidal time evolution, but only to a certain degree. However, if the object is in motion and some of the amplitude samples actually correspond to a signal received from a surface of the object, while others correspond to a signal received from the background, there will normally be a high discrepancy between the amplitude samples and any sinusoidal function. In other words, the amplitude samples will not correspond to a sinusoidal time evolution at all, which influences the confidence value. It should be noted that in general at least 4 amplitude samples are necessary to determine the degree of correspondence. A sinusoidal function can be described by 4 parameters, namely amplitude, offset, phase and frequency. Since the frequency of the sinusoidal function is known in the present case, 3 parameters remain. Thus, it would always be possible to find a "fitting" sinusoidal function for 3 (or less) amplitude samples. On the other hand, if there are 4 or more amplitude samples, any deviation from the sinusoidal time evolution can be determined.

[cm 1] In another step of the method, for each of a plurality of binning areas, each of which comprises a plurality of pixels, a binned depth value is determined based on the amplitude samples of sample sequences of pixels from the binning area, wherein the contribution of a sample sequence to the binned depth value depends on its confidence value. This method step can be described as a "binning step". Binning as such is known in the art, but the inventive method applies a previously unknown variant that could be referred to as "smart binning" or the like. A plurality of binning areas are defined, wherein each binning area comprises a plurality of pixels. Each binning area may be rectangular, e.g. comprising m×n pixels or n×n pixels. One could also refer to the binning area as a pixel group. Normally, each binning area is coherent, i.e. it corresponds to a coherent area of the sensor array. It is conceivable that two binning areas overlap, so that a given pixel belongs to more than one binning area. Normally, though, different binning areas are separate. In this case, the binning areas together can be considered as units or "pixels" of a low resolution image, while the pixels of the sensor array correspond to a high resolution image. The amplitude samples of sample sequences of pixels from the binning area contribute to the binned depth value for this binning area. One could also say that information from the amplitude samples of sample sequences of pixels from the binning area is combined to obtain the binned depth value. There are several possibilities how the binned depth value can be calculated, some of which are discussed further below.

If a depth value was determined for a single pixel (and a single sample sequence), this would be done by determining a relative phase of the sinusoidal function, which phase would correspond to a depth value. However, as mentioned above, since the phase of the sinusoidal function is determined from the amplitude samples, the phase information is affected if some of the amplitude samples correspond to the object and some correspond to its background. Any depth information derived from a sample sequence with such amplitude samples is mostly useless. However, according to the inventive method, the confidence value is determined for each sample sequence of each pixel, whereby the reliability of the phase information can be assessed. Then, when using the information from the amplitude samples of given pixel to determine the binned depth value, not all sample sequences of pixels in the binning area are treated equally (as in binning methods known in the art), but the contribution of a sample sequence to the binned depth value depends on its confidence value. Qualitatively, the contribution of a sample sequence with a high confidence value is usually greater than the contribution of a sample sequence with a low confidence value. The latter contribution may even be zero, i.e. this sample sequence may completely be ignored.

The inventive concept allows to increase the reliability of the binned depth value, because "corrupted" sequences of amplitude samples are taken into account less or even not at all. Also, the confidence value can be determined based on information of the respective pixel alone, i.e. it is not necessary to take into account other pixels. As will become apparent below, the confidence value can also be calculated with a minimum of processing power and memory. This also means that the calculations can be done in real-time even by a simple, low-cost processing unit.

Preferably, the method comprises acquiring four amplitude samples at a sampling frequency four times higher than a modulation frequency of the amplitude-modulated continuous light. This corresponds to the well-known 4-tap method. A sine wave modulation received signal with amplitude A and phase $\phi$ can be represented by a 2D vector:

$$r(A,\phi) = (A \cdot \cos \phi, A \cdot \sin \phi) = (d_{13}, d_{02}) \quad \text{(eq. 1)}$$

where $d_{02} = A_0 - A_2$, which is hereinafter referred to as a first difference, and $d_{13} = A_1 - A_3$, which is hereinafter referred to as a second difference, are the pairwise differences of two amplitude samples $A_k$, $k = 0 \ldots 3$, where the first amplitude sample $A_0$ corresponds a phase angle of 0°, the second amplitude sample $A_1$ corresponds to a phase angle of 90°, the third amplitude sample $A_2$ corresponds to a phase angle of 180° and the fourth amplitude sample $A_3$ corresponds to a phase angle of 270°. The amplitude and phase of the received signal can therefore be computed as $$\phi = a\tan 2(d_{02}, d_{13}) \quad \text{(eq. 2)}$$

$$A = \sqrt{(d_{02})^2 + (d_{13})^2} \quad \text{(eq. 3)}$$

While the amplitude A of the signal is proportional to the number of the received photons, the phase $\phi$ is proportional to the depth D of the object seen by the corresponding pixel.

$$\phi = \frac{4\pi f_{mod}}{c} * D \quad \text{(eq. 4)}$$

where D is the measured object depth from the camera, c is the speed of light and $f_{mod}$ is the modulation frequency of the signal. Accordingly, the depth can be calculated by $$D = \frac{c}{4\pi f_{mod}} * \phi \quad \text{(eq. 5)}$$

There are various options how the confidence value can be defined. One possible definition of the confidence value C is as follows:

$$C = 1 - \frac{|A_1 - A_0 + A_3 - A_2|}{A} \quad \text{(eq. 6)}$$

where the amplitude A is computed according to eq.3, but may be approximated by $$A=\sqrt{(d_{02})^2+(d_{13})^2} \approx \text{MAX}(|d_{02}|,|d_{13}|) \qquad \text{(eq. 7)}$$

In a simple embodiment, only one sample sequence is acquired for each pixel, wherefore only the amplitude samples of this sample sequence can be taken into account for the confidence value and for the binned depth value. In such an embodiment, one could also say that a (single) confidence value is determined for each pixel, since each pixel corresponds to a single sample sequence. In another embodiment, the method comprises acquiring, for at least one pixel, a plurality of sample sequences. These may also be referred to as a plurality of exposures. On the one hand, multiple exposures, which have to be performed sequentially, increase the probability that some pixels are affected by a movement of an object. On the other hand, taking into account a plurality of sample sequences may help to decrease the effects of noise or other measurement errors. In particular, it is possible to perform the tap measurements for acquiring the amplitude samples with different integration times for different sample sequences, i.e. each sample sequence corresponds to a different integration time. Apart from changing the exposure time, it would be possible to change other parameters, e.g. the modulation frequency.

Even if a plurality of sample sequences are acquired for a given pixel, each confidence value can be determined by a relation of the amplitude samples of an individual sample sequence to each other. In other words, the amplitude samples of a sample sequence are regarded without taking into account amplitude samples of other sample sequences (if present). Eq.6 is an example for such an embodiment. For the most part, this approach is reliable because the amplitude samples for an individual sample sequence are not affected by e.g. different exposure times. It should be noted though, that if a plurality of sample sequences have been determined, an individual confidence value should be determined for each sample sequence, e.g. because one sample sequence for a given pixel could be unaffected by object motion, while another sample sequence is affected and therefore yields unreliable data.

There are many possibilities how the different sample sequences can contribute to the binned depth value based on their respective confidence value. For example, there could be a continuous range of contribution or weighting factors. Another possibility can be referred to as a "binary" classification. In this case, the method comprises classifying each sample sequence as valid if the confidence value fulfils a predefined criterion and as invalid otherwise. In other words, each sample sequence can only be valid or invalid. The method in this case further comprises using the amplitude samples of a sample sequence to determine the binned depth value only if the pixel is valid. In other words, if a sample sequence is regarded as invalid, the amplitude samples of this sample sequence are completely ignored and do not influence the binned depth value. If there is only one sample sequence considered for each pixel, one could also say that each pixel is classified as valid or invalid, respectively. The same is true if one considers only the sample sequences of a specific exposure individually.

In particular, the sample sequence can be classified based on a relation of the confidence value to a first threshold value. In other words, it is determined whether the confidence value is above or below the first threshold value and depending on the result, the sample sequence is classified as valid or invalid. Normally, the confidence value is high for a high degree of correspondence and the sample sequence is classified as valid if the confidence value is above the first threshold. The first threshold (which could also be referred to as a motion parameter) is normally predefined. It could be estimated, calculated or it could be determined by calibration e.g. using a stationary scenery without moving objects. Graphically speaking, this approach can be described by a confidence mask that masks all pixels having a confidence value below the first threshold value.

According to one embodiment, the binned depth value is determined based on a linear combination of amplitude samples of sample sequences of pixels from the binning area, wherein the contribution of each sample sequence to the linear combination depends on the confidence value of the respective sample sequence. In other words, in the linear combination, each amplitude sample is assigned a coefficient that depends on the confidence value of the respective sample sequence. In general, of course, the coefficient will be higher for a high confidence value and lower for a low confidence value. In particular, the coefficient can be one if the confidence value is above the first threshold and can be zero if the confidence value is below the first threshold. In this case, the linear combination corresponds to a sum over all valid sample sequences, while all invalid sample sequences are ignored. For example, it is possible to define the first and second difference mentioned above for each valid sample sequence and then to define a "binned" first and second difference that correspond to the sum of the respective differences over all valid sample sequences. It is understood that this is equivalent to first taking the sum of the amplitude samples to determine "binned" amplitude samples and then calculating the binned first and second difference. When the binned differences have been determined, a "binned" phase can be calculated according to eq.2. Taking the sum of the differences can also be regarded as a vector addition, with the first and second difference being the components of the vectors, which vector addition results in a binned vector. Therefore, this approach could also be referred to as "vector binning" or "weighted vector binning".

According to a different embodiment, the binned depth value $D_b$ is determined by averaging pixel depth values of sample sequences of pixels from the binning area, wherein a weight of each pixel depth value depends on the confidence value of the respective sample sequence of the respective pixel, and wherein the pixel depth value is determined based on the amplitude samples of the sample sequence of the pixel. In other words, pixel depth values D are determined individually for each sample sequence of the pixels in the binning area, or possibly only for the valid sample sequences of pixels in the binning area. These pixel depth values D can be determined e.g. using eq.2 and eq.5. Then, the pixel depth values are averaged to determine the binned depth value $D_b$, but in a weighted manner, so that the weight depends on the confidence value of respective sample sequence of the respective pixel. This approach could also be referred to as "depth binning" or "weighted depth binning". Again, the weight of a pixel depth value is higher for a high confidence value and lower for a low confidence value. In particular, the weight of a pixel depth value can be zero if the confidence value is below the first threshold, i.e. only pixel depth values for valid sample sequences are taken into account. If there is only one sample sequence for each pixel, the calculation can be performed as follows:

$$D_b = \frac{1}{N_{valid\ pixels}} \sum_{valid\ points} D \qquad \text{(eq. 8)}$$

In such an embodiment, the binned depth value corresponds to the (arithmetic) average of the pixel depth values of all valid pixels (i.e. the pixels with a valid sample sequence). If multiple sample sequences are acquired for each pixel, a pixel depth value is determined for each sample sequence individually and eq.8 has to be modified to average over all valid sample sequences of all pixels (or over all valid pixels of all integration times).

In one embodiment, the method comprises determining a first difference between a first amplitude sample and a third amplitude sample of a sample sequence of a pixel, and assigning sample sequences having a positive first difference to a first group and sample sequences having a negative first difference to a second group. In particular, this may refer to only the valid sample sequences, while the invalid sample sequences are not included in either group. The first difference $d_{02}=A_0-A_2$ has already been mentioned above. When the first and second difference are considered as components of a vector, a phase difference of any two vectors having a positive first difference is less than 180° and a phase difference of any two vectors having a negative first difference is less than 180°. When two vectors from the first group (or the second group, respectively) are added, the phase of the resulting vector is between the phases of the added vectors. Correspondingly, according to eq.5, the depth corresponding to the resulting vector is also between the depths corresponding to the two added vectors. It should be noted that in general, it is possible that all sample sequences may have a positive first difference or all sample sequences may have a negative first difference, respectively. If this is the case, it is of course unnecessary to divide the sample sequences into groups.

Furthermore, the method may comprise defining a vector having a second difference between a second amplitude sample and a fourth amplitude sample as a first component and the first difference as a second component. The second difference $d_{13}=A_1-A_3$ has been explained above. Further, the method can comprise defining a first group vector $r_P=[x_P y_P]$ which is a linear combination, based on the confidence value of the respective sample sequence, of the vectors of the first group and a second group vector $r_M=[x_M y_M]$ which is a linear combination, based on the confidence value of the respective sample sequence, of the vectors of the second group. In the first group vector, the vectors of the first group are linearly combined based on the confidence value of the respective sample sequence. In other words, the coefficient or weight of the vector depends on the confidence value. In particular, the weight may be zero if the confidence value is below the first threshold and may be one if the confidence value is above the first threshold, in which case only valid sample sequences are added. The same applies to the linear combination of vectors of the second group. More particularly, each group vector may be the sum over all vectors in the respective group, in which case the components of the first and second group vector $r_P$, $r_M$ are calculated as follows, where the sum over multiple integration times is optional:

$$y_P = \sum_{It=0}^{n} \sum_{\substack{\text{valid pixels} \\ \text{with } d_{02It}>0}} d_{02It} \quad \text{(eq. 9a)}$$

$$x_P = \sum_{It=0}^{n} \sum_{\substack{\text{valid pixels} \\ \text{with } d_{02It}>0}} d_{13It} \quad \text{(eq. 9b)}$$

-continued $$y_M = \sum_{It=0}^{n} \sum_{\substack{\text{valid pixels} \\ \text{with } d_{02It}<0}} d_{02It} \quad \text{(eq. 9c)}$$

$$x_M = \sum_{It=0}^{n} \sum_{\substack{\text{valid pixels} \\ \text{with } d_{02It}<0}} d_{13It} \quad \text{(eq. 9d)}$$

Here, each sample sequence corresponds to an individual integration time. In eqs. 9a-9d, it is assumed that there is the same number of sample sequences (or integration times, respectively) for each pixel. The sum over "valid pixels" is to be understood as the sum over all pixels with a valid It-th (It=0 . . . n) sample sequence. Alternatively, one could sum over all pixels and over all valid sample sequences of the respective pixel. Analogous to eq.2, the phases of the group vectors are calculated as:

$$\phi_P = \operatorname{atan}\left(\frac{y_P}{x_P}\right)$$

and $$\phi_M = \operatorname{atan}\left(\frac{y_M}{x_M}\right)$$

As explained above, the phase and therefore the depth corresponding to the first group vector is in the interval of the individual vectors of the first group. Also, the phase corresponding to the second group vector is in the interval of the individual vectors of the second group. In another step, the method comprises determining the binned depth value based on a phase difference between the second group vector and the first group vector. In other words, the phase difference between the second group vector and the first group vector is determined (or a quantity depending on the phase difference) and determination (or calculation) of the binned depth value depends on this phase difference. Normally, both phases are assumed to be between 0° and 360°.

According to one embodiment, the method further comprises determining the binned depth value based on both the first group vector and the second group vector if the phase difference is below a second threshold, and determining the binned depth value based on only one of the first group vector and the second group vector if the phase difference is above the second threshold. Like the first threshold, the second threshold could be estimated, calculated or determined by calibration using a stationary scenery. If the phase difference is below the second threshold, this usually corresponds to a case where all (or most) first differences have a comparatively low absolute value with some of the first differences being positive and some being negative, while the second differences are mostly negative. In this case it can be assumed that the first group vector and the second group vector only differ to a minor extent and the first group vector the second group vector could be added, $$r_b = r_P + r_M \quad \text{(eq. 10)}$$

after which the binned depth value could be determined based on the resulting binned vector, again using eq.5. If, on the other hand, the phase difference is above the second threshold, this indicates that the first and second group vector could correspond to different depths, e.g. of a foreground object and of a background. In this case, it is more appropriate to discard one group vector completely and to determine the binned depth value only based on the other vector.

According to one embodiment, the second threshold is 180°. This can be regarded as the minimum condition for avoiding unrealistic depth values that are outside the interval given by the first group vector and the second group vector. However, the second threshold can be smaller, e.g. less than 90° or less than 60°. If the second threshold is 180°, the phase difference does not have to be calculated explicitly. Rather, it can be shown that the phase difference is below 180° under the following condition:

$$x_M y_P < x_P y_M$$

Testing this condition requires only two multiplications and therefore saves processing power. Alternatively, it is also possible to explicitly calculate the phase difference based on the phases of the first group vector and the second group vector.

There are various possible criteria for determining which of the first and second group vector is considered more reliable if the phase difference is above the second threshold. In general, it is reasonable to assume that if one group vector is based on a higher number of valid sample sequences, this group vector is more reliable. Therefore, if the phase difference is above the second threshold, the binned depth value can be determined based on the group vector of the group having more valid sample sequences. In other words, if the first group has more valid sample sequences than the second group, the binned depth value is determined based on the first group vector, and vice versa:

$$r_b = \begin{cases} r_P; & N_P > N_M \\ r_M; & N_M > N_P \end{cases} \quad \text{(eq. 11)}$$

where $N_P$, $N_M$ are the numbers of valid sample sequences in the first and second group, respectively.

According to another embodiment, the method comprises determining the binned depth value based on both the first group vector and the second group vector if the first components $x_P$, $x_M$ of both group vectors are negative, and determining the binned depth value based on only one of the first group vector and the second group vector if at least one first component is positive. If the first component of the first group vector and the first component of the second group vector are both negative, this means that the group vectors are in the second and third quadrant, corresponding to a phase close to 180° and an object depth close to half of the ambiguity depth. If, however, at least one first component is positive, the vectors are either in opposite quadrants (first and third quadrant or second and fourth quadrant, respectively) or they are in the first and fourth quadrant, with one vector corresponding to a phase close to 360° or a depth close to the ambiguity depth.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
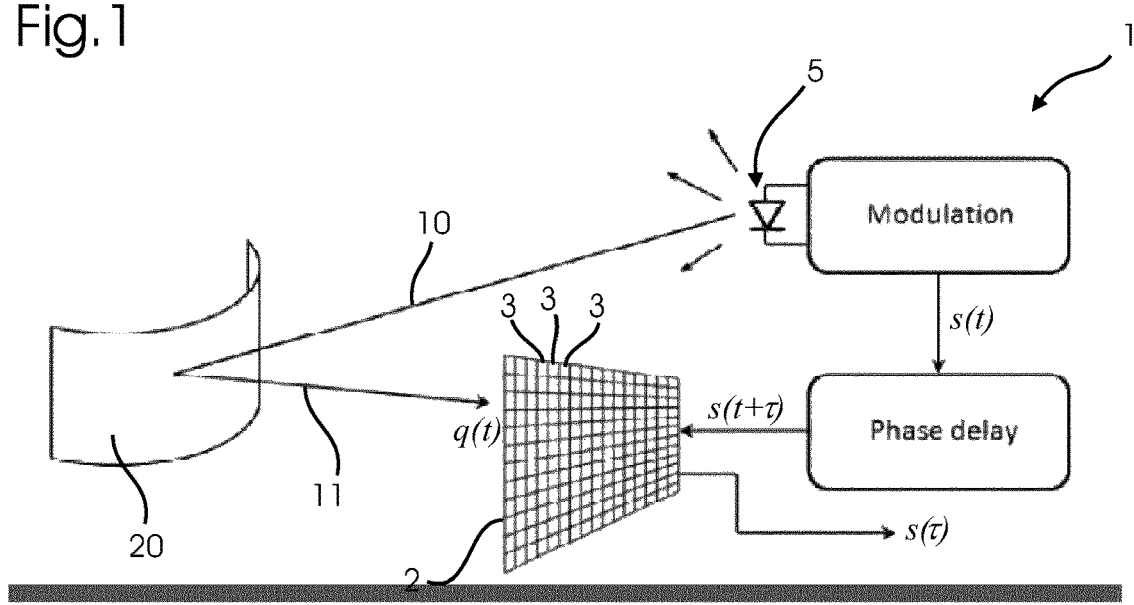
FIG. 1 is a schematic view of a TOF camera that can be used for the inventive method and an object.
Figure 2:
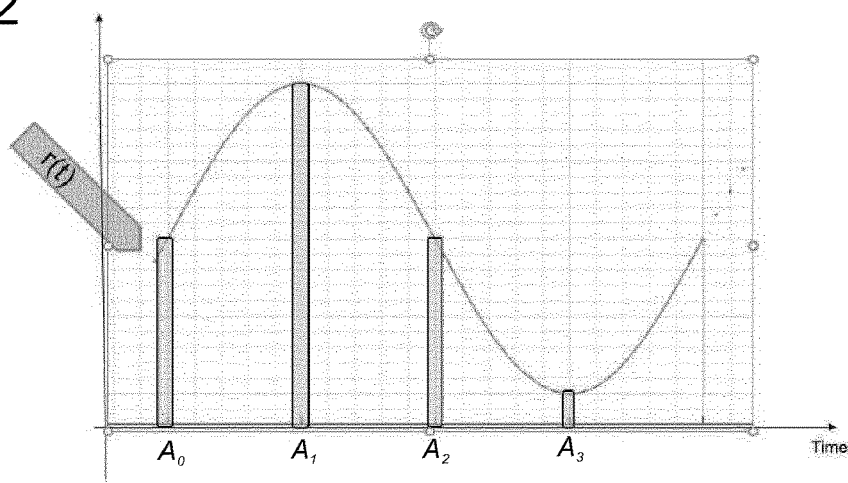
FIG. 2 is a diagram showing the time evolution of a function and four amplitude samples.

FIG. 1 schematically shows a TOF camera 1 that is adapted for depth measurement using amplitude-modulated continuous light. It comprises a rectangular sensor array 2 with a plurality (e.g. several thousand or several ten thousand) of pixels 3. Furthermore, it may comprise a memory and a processing unit, which are not shown for sake of simplicity. The camera 1 is configured to emit amplitude-modulated continuous light 10 using one or several light emitters 5. The light 10 is reflected by a 3D object 20 or scenery in a field of view of the camera 1 and the reflected light 11 is received by the pixels 3 of the sensor array 2. The original modulation function s(t), with a phase delay τ, is correlated with the received function q(t), which yields a correlation function c(τ). The amplitude of the received function q(t) is sampled at a frequency four times higher than a modulation frequency $f_{mod}$ of the light 10. In other words, four amplitude samples $A_{0 \ldots 3}$, also referred to as taps, are used to retrieve the phase φ of the modulated light, as illustrated by FIG. 2. Each four amplitude samples $A_{0 \ldots 3}$ are part of a sample sequence for the respective pixel 3.

A sinusoidal signal with amplitude A and phase φ can be represented by a 2D vector that can be determined from the 4 amplitude samples determined in the tap measurements, i.e.

$$r(A,\phi) = (A \cdot \cos \phi, A \cdot \sin \phi) = (d_{13}, d_{02}) \quad \text{(eq. 1)}$$

where $d_{02} = A_0 - A_2$, which is hereinafter referred to as a first difference, and $d_{13} = A_1 - A_3$, which is hereinafter referred to as a second difference, are the pairwise differences of two amplitude samples $A_k$, k=0 . . . 3. The amplitude and phase of the received signal can therefore be computed as $$\phi = a\tan 2(d_{02}, d_{13}) \qquad (eq.2)$$

$$A = \sqrt{(d_{02})^2 + (d_{13})^2} \qquad (eq.\ 3)$$

While the amplitude A of the signal is proportional to the number of the received photons, the phase $\phi$ is proportional to the depth D of the object seen by the corresponding pixels.

$$\phi = \frac{4\pi f_{mod}}{c} * D \qquad (eq.\ 4)$$

where D is the pixel depth value, i.e. the distance from the pixel of the camera, c is the speed of light and $f_{mod}$ is the modulation frequency of the signal. Accordingly, the depth can be calculated by $$D = \frac{c}{4\pi f_{mod}} * \phi \qquad (eq.\ 5)$$

Figure 3:
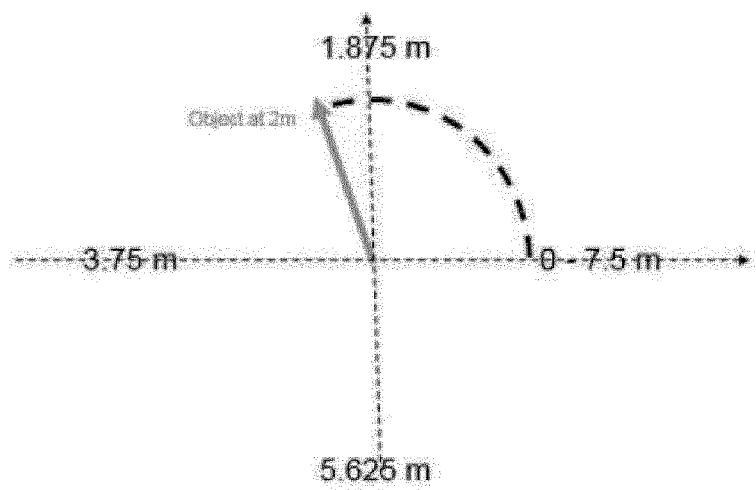
FIG. 3 is a vector diagram.

FIG. 3 is a vector representation of the signal received from an object in a depth of D=2 m when the modulation frequency is $f_{mod}$=20 MHz.

Figure 4:
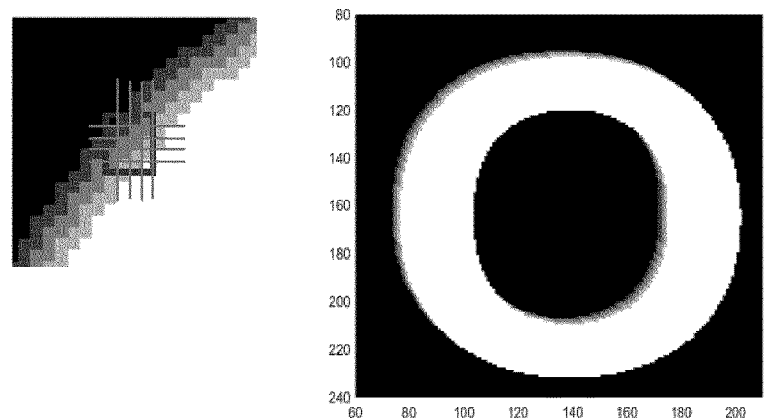
FIG. 4 is a diagram illustrating amplitude values on a sensor array.

However, motion artifacts can occur along the edges of an object 20 which is moving in the scene of the camera 1. As tap measurements are performed subsequently, a pixel 3 close to an object edge may "see" the object surface during the acquisition of one amplitude sample, while in a subsequent acquisition it may see the background. FIG. 4 shows by way of example the occurrence of a motion artifact. An object 20 with the shape of an 'O' is shifted 1 pixel up and 1 pixel left during the acquisition of each amplitude sample. The greyscale values represent the number of tap measurements with the object present in the respective pixel. A black pixel represents zero tap measurements with the object present, while a white pixel represents four (out of four) tap measurements with the object present. On the right is the full image, on the left a zoom around the upper left outer edge of the 'O'.

Figure 5:
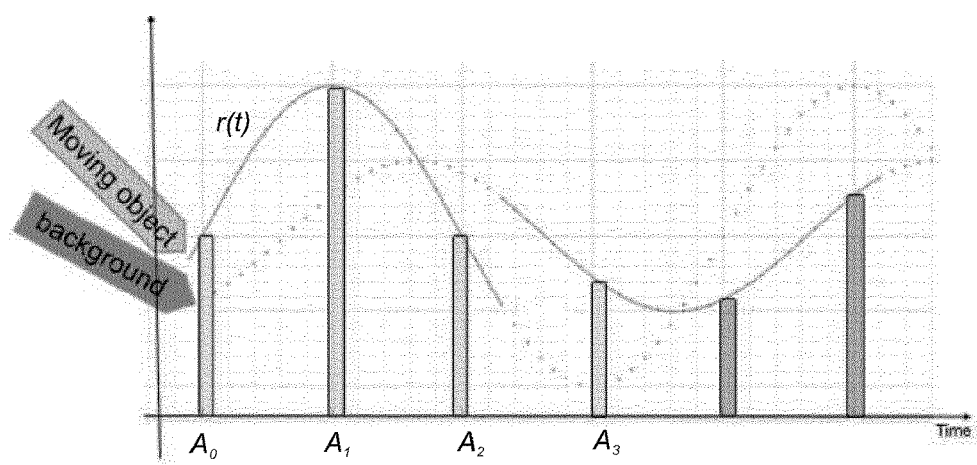
FIG. 5 is another diagram showing the time evolution of a function and a plurality of amplitude samples.

FIG. 5 illustrates the error introduced by the motion of the object 20. Depending on what the pixel 3 sees during the acquisition, the measured amplitude sample $A_k$ lies on the sinusoidal cross correlation curves of the foreground, or the background signal. If one sums up the 4 subsequent amplitude samples $A_k$ of one pixel 3, one recognizes a blurring effect along the edge of the object 20. In a neighbourhood of 4×4 pixels 3 one can find a pixel 3 that "sees" in all taps the foreground object 20 as well as pixels 3 that partly see the foreground object 20 or the background. If there are subsequently acquisitions with different integration times performed, corresponding to additional sample sequences, they may also correspond to a different depth.

Figure 6:
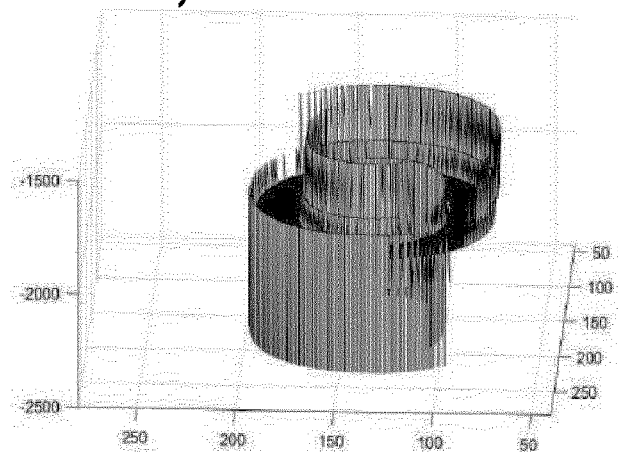
FIG. 6 is a first diagram illustrating the results of a depth measurement according to prior art.

Due to the different depth and remission of the foreground and background object, the amplitude samples $A_k$ may vary drastically. As a consequence, the phase and depth computed according to eq.2 and eq.5 may be wrong. The result is illustrated by the diagram in FIG. 6, which is a high-resolution depth image of an "O" shaped target at 2 m depth in front of a background at 7 m with moving with a shift of 1 pixel per tap acquisition in both horizontal and vertical direction. Along the object edges, the calculated depths vary between 1.65 m and 5.41 m, due to the motion artifact. It should be noted that the measured depths lie not only between the foreground and the background depth, but can be also outside of this depth range. The corresponding pixels may be referred to as flying pixels.

Figure 7:
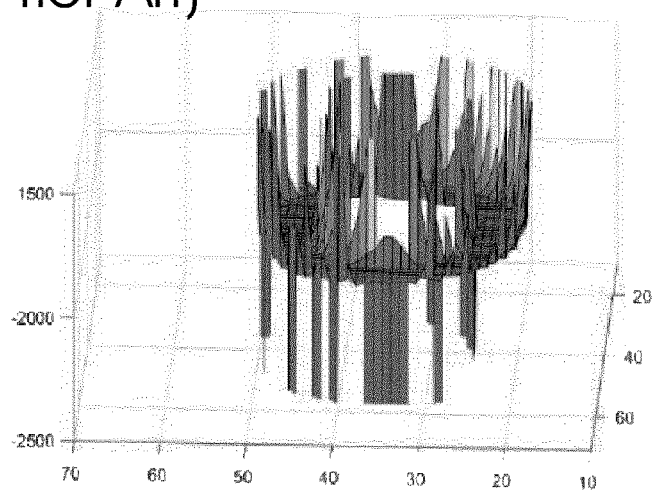
FIG. 7 is a second diagram illustrating the results of a depth measurement according to prior art.
Figure 8:
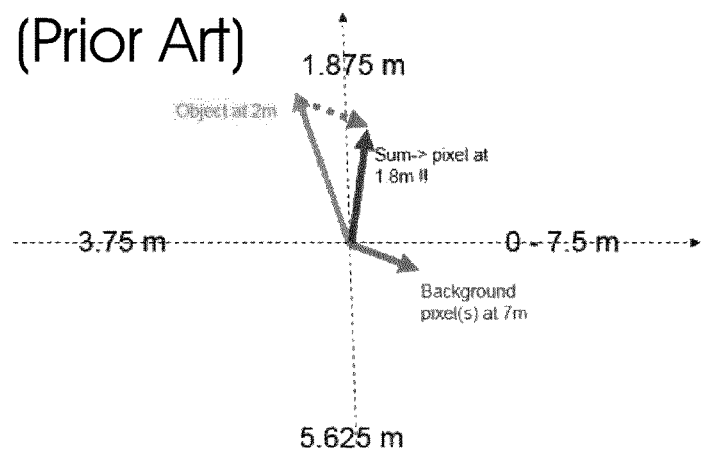
FIG. 8 is a vector diagram illustrating a vector addition.

According to prior art, there are two main approaches to alleviate this problem, both of which make use of a binning method. A plurality of pixels, e.g. 4×4 pixels, are taken as a binning area, for which a single depth value is determined. In a first approach, the amplitude sample $A_k$ for all pixels in the binning area are summed and a single depth value is calculated using eq.2 (with the sums instead of the individual amplitude samples $A_k$) and eq.5. This approach may be referred to as "tap binning". The result of this is shown in FIG. 7. One recognizes that there are outliers in the measured depth lying in a range between 0.31 m and 6.93 m. In other words, there are still depth values outside the depth range of the object 20 and the background, and the flying-pixel effect is even increased compared to the high-resolution image of FIG. 6. One reason for this increase can be understood by the vector diagram of FIG. 8. Adding the amplitude samples $A_k$ corresponds to a vector addition as shown in FIG. 8 for a first vector representing the depth of the object 20 and a second vector representing the background. Since the phases of the two vectors differ by over 180°, the phase of the resulting vector is smaller than that of either vector. This leads to a depth value outside the depth range.

Figure 9:
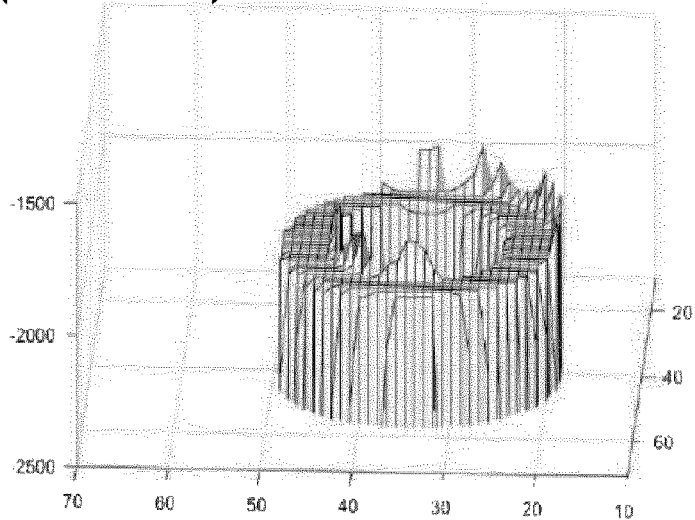
FIG. 9 is a third diagram showing the results of a depth measurement according to prior art.

According to another approach, pixel depth values are determined for each individual pixel in the binning area and these pixel depth values are averaged to determine a depth value for the binning area. This approach may be referred to as "pixel binning". The results are shown in FIG. 9. The averaging leads to a blurring of the depth values lying in the range from 1.81 m to 6.9 m.

Figure 10:
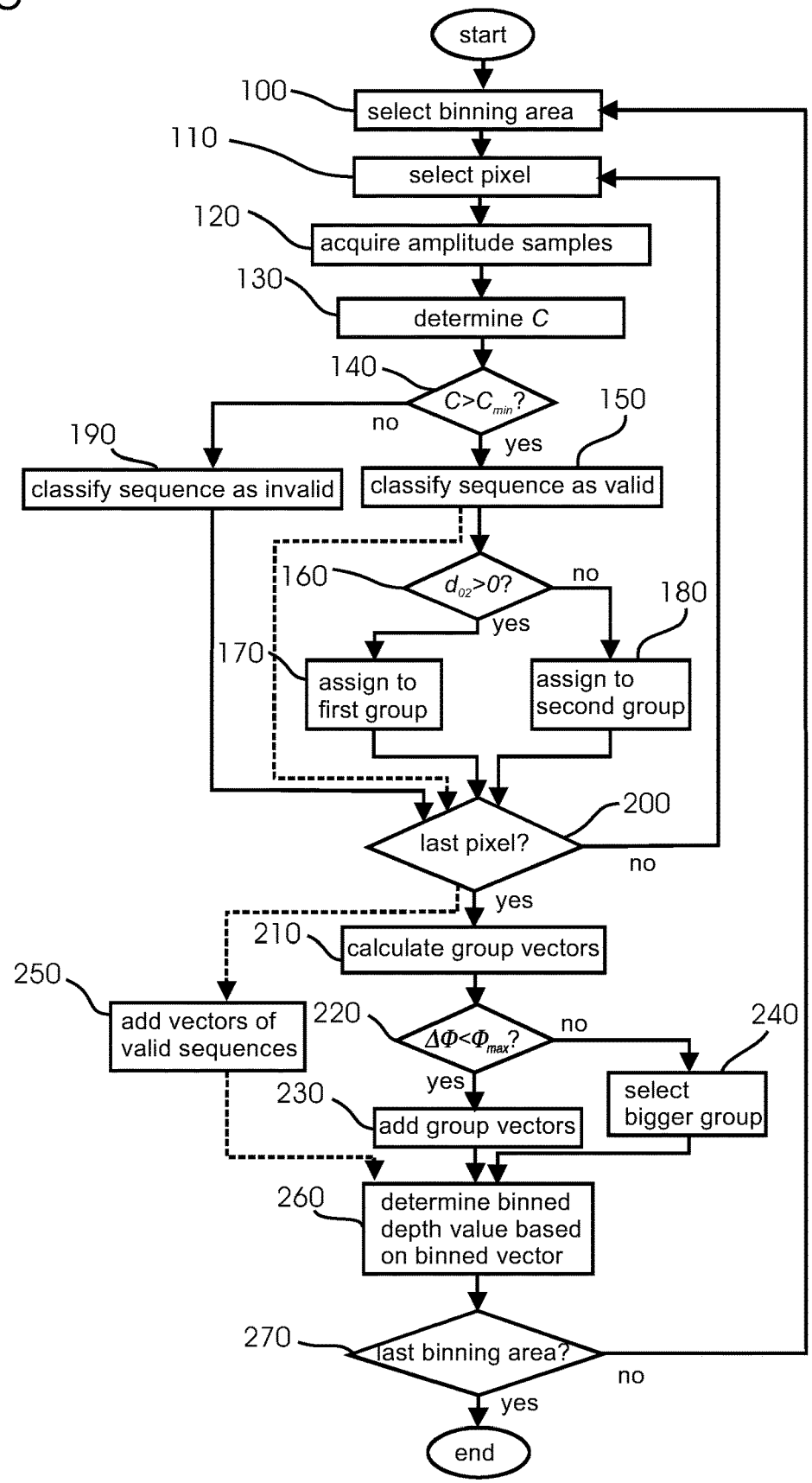
FIG. 10 is a flowchart illustrating a first embodiment of the inventive method.

The abovementioned problems are reduced or eliminated by the inventive method. FIG. 10 is a flow chart illustrating a first embodiment of the inventive method.

After the start of the method, a binning area 4 is selected at 100. This may be e.g. an area comprising 4×4 pixels 3 (see also FIG. 12). Next, a pixel 3 within the binning area 4 is selected at 110. At 120, the amplitude samples $A_k$ are determined for a sample sequence of this pixel 3. At 130, a confidence value C is calculated based on the amplitude samples $A_k$. An individual confidence value C is calculated for every sample sequence of the respective pixel 3, i.e. if there is only one sample sequence, one confidence value C is calculated for each pixel. One possible definition of the confidence value C is as follows:

$$C = 1 - \frac{|A_1 - A_0 + A_3 - A_2|}{A} \qquad (eq.\ 6)$$

where the amplitude A is computed according to eq.3, but can be approximated by $$A = \sqrt{(d_{02})^2 + (d_{13})^2} \approx \text{MAX}(|d_{02}|, |d_{13}|) \qquad (eq.\ 7)$$

By this definition, the confidence value C is always in the range between 0 and 1, with the highest possible value 1 representing a perfect sinusoidal function. At 140, this confidence value C is compared with a first threshold $C_{min}$, which could be calculated, estimated or determined by calibration using a stationary scenery. In the following examples, the first threshold $C_{min}$ could be 0.25. The first threshold $C_{min}$ may also be referred to as a "motion parameter", since it may be suitable to distinguish sample sequences that are affected by object motion from those that are unaffected by object motion. If the confidence value C is smaller than the first threshold $C_{min}$, the respective sample sequence is classified as invalid at 190 and is basically not regarded further. If, on the other hand, the confidence value C is greater than the first threshold $C_{min}$, the respective sample sequence is classified as valid at 150. The amplitude values or the first and second difference $d_{02}$, $d_{13}$, which can be regarded as second and first component of a vector, respectively, are kept for further processing.

Figure 11:
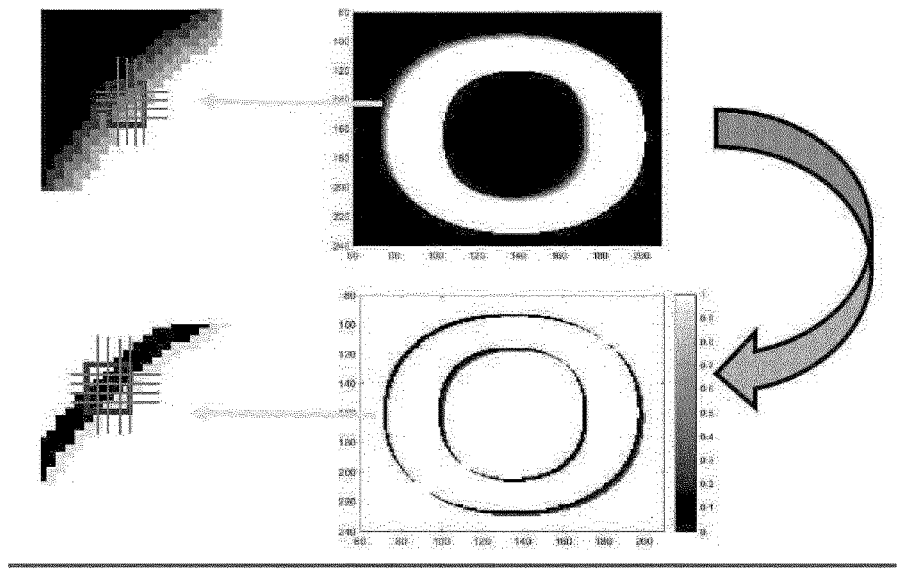
FIG. 11 is a diagram illustrating a binary confidence mask.

This procedure can be regarded as a creation of a binary confidence mask, which is graphically illustrated in FIG. 11. The upper part of FIG. 11 corresponds to FIG. 4, while the lower part shows the corresponding confidence mask, with the left part being a magnification of a portion near the edge of the object 20. The black colour indicates pixels that are regarded as invalid, while the white colour indicates pixels with sample sequences that are regarded valid. One recognizes that the areas where the taps are blurred are masked by the confidence mask.

Figure 12:
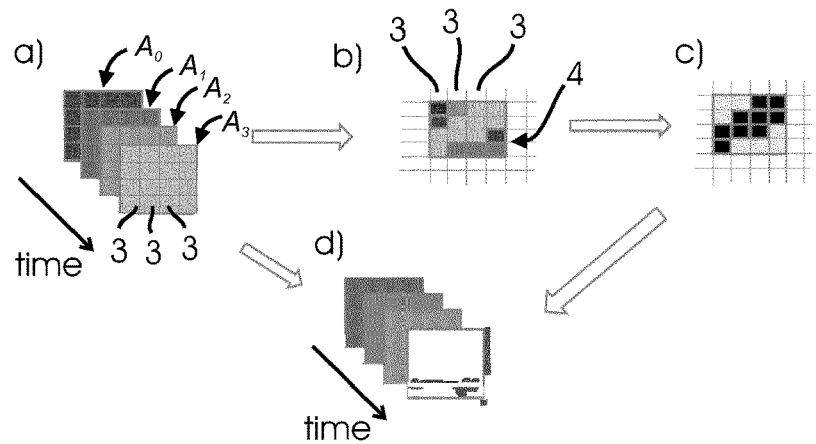
FIG. 12 is a diagram illustrating the construction of a binary confidence mask and the application of this confidence mask.

FIG. 12 further illustrates the construction of the confidence mask and the binning process for a binning area 4 of 4×4 pixels 3, where for sake of simplicity, a single sample sequence for each pixel 3 is assumed. First, as illustrated at a), individual amplitude samples are determined for each pixel (with the different shades representing sample numbers or points in time, respectively). Then, as shown in at b), confidence values are determined for each pixel (with dark tones representing high confidence values). At c) a confidence mask is shown with black representing pixels (or sample sequences, respectively) that are invalid and white representing pixels that are valid. Using this confidence mask together with the individual amplitude samples effectively yields binned amplitude samples for the entire binning area 4, as illustrated at d), where different shades again represent sample numbers or points in time, respectively). If several sample sequences, corresponding to several integration times, are considered, a confidence mask can be constructed for each integration time.

At 160, the sign of the first difference $d_{02}$ is determined. If the sign is positive, the sample sequence and its vector are assigned to a first group at 170, and if the sign is negative, the sample sequence and its vector are assigned to a second group at 180. As indicated by the dashed arrows, the steps 160, 170 and 180 can also be skipped in a simplified version of the method.

The steps mentioned so far are repeated for all pixels 3 in the binning area 4 and, where applicable, for all sample sequences of each pixel 3. When it is determined at 200 that the last pixel 3 has been processed, the method continues at 210 by adding the vectors in the first and second group, respectively, to calculate a first group vector $r_P=[x_P y_P]$ and a second group vector $r_M=[x_M y_M]$. In other words, all vectors with a positive first difference $d_{02}$ are summed and all vectors with a negative first difference $d_{02}$ are summed. Therefore, the components of the first and second group vector $r_P$, $r_M$ are calculated as follows, where the sum over multiple integration times is optional:

$$y_P = \sum_{It=0}^{n} \sum_{\substack{\text{valid pixels} \\ \text{with } d_{02It}>0}} d_{02It} \quad \text{(eq. 9a)}$$

$$x_P = \sum_{It=0}^{n} \sum_{\substack{\text{valid pixels} \\ \text{with } d_{02It}>0}} d_{13It} \quad \text{(eq. 9b)}$$

$$y_M = \sum_{It=0}^{n} \sum_{\substack{\text{valid pixels} \\ \text{with } d_{02It}<0}} d_{02It} \quad \text{(eq. 9c)}$$

$$x_M = \sum_{It=0}^{n} \sum_{\substack{\text{valid pixels} \\ \text{with } d_{02It}<0}} d_{13It} \quad \text{(eq. 9d)}$$

It should be noted that in either of the first and second group, only vectors of valid sample sequences are summed, while invalid sample sequences are disregarded for the binning process. The phases of any two vectors in the first group differ by less than 180°, wherefore the addition of these vectors cannot lead to flying pixels. The same applies to the vectors in the second group. The fact that the phases of the summed vectors differ by less than 180° guarantees that the resulting group vectors are not affected by the binning effect.

Figure 13:
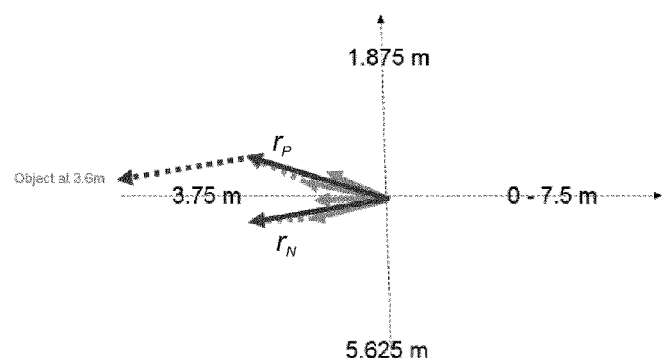
FIG. 13 is another vector diagram illustrating a vector addition.

At 220, the phase difference $\Delta\Phi$ of the second and first group vector is calculated (assuming both phases to be between 0° and 360°) and compared to a second threshold $\Phi_{max}$. In particular, the second threshold $\Phi_{max}$ may be equal to 180°. If the phase difference $\Delta\Phi$ is smaller, like in the example of FIG. 13, the first and second group vector $r_P$, $r_M$ are simply added at 230 to calculate a binned vector $r_b=[x_b y_b]$, i.e.:

$$r_b = r_P + r_M \quad \text{(eq. 10)}$$

Figure 14:
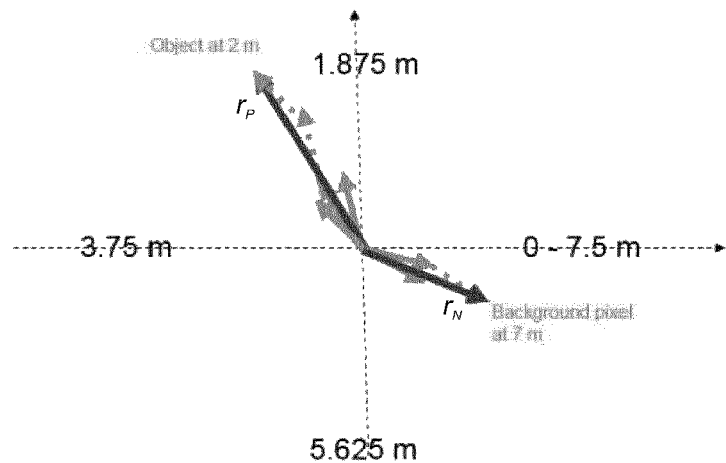
FIG. 14 is vector diagram illustrating the positions of two group vectors.

If the phase difference $\Delta\Phi$ is greater, as shown in the example of FIG. 14, this could indicate that the groups correspond to pixels 3 of background and foreground objects, respectively. Either way, adding the two group vectors $r_P$, $r_M$ would result in a flying pixel. For these reasons, one group vector $r_P$, $r_M$ is selected as the binned vector $r_b$ at 240, namely the group vector of the bigger group, i.e. the group with the higher number of valid sample sequences:

$$r_b = \begin{cases} r_P; & N_P > N_M \\ r_M; & N_M > N_P \end{cases} \quad \text{(eq. 11)}$$

where $N_P$, $N_M$ are the numbers of valid sample sequences in the first and second group, respectively. Finally, the binned depth value $D_b$ is determined based on the binned vector $r_b$ using eq.2 and eq.5.

If several sample sequences with several integration times $It=1, 2, \ldots n$ are recorded, the binned values, e.g. the components $x_b$, $y_b$ can be normalized as:

$$[x_b, y_b]_{norm} = \frac{1}{\sum_{It=1}^{n} N_{It} T_{It}} \cdot [x_b, y_b]$$

with $N_{It}$ being the number of pixels 3 with valid sample sequences for a specific integration time and $T_{It}$ being the length of the integration time. This yields a normalized amplitude which shows no artificial jumps as it is independent on the number of pixels 3 considered in the binning and thus allows to apply standard image processing methods, like stray light compensation to the binned taps or amplitude.

In the simplified version of the method indicated by the dashed line, all vectors of valid pixels 3 are added to determine the binned vector $r_b$ at 250:

$$x_b = \sum_{lt=0}^{n} \sum_{\substack{\text{valid pixels} \\ \text{in binning Area}}} d_{13,lt} \qquad \text{(eq. 12a)}$$

$$y_b = \sum_{lt=0}^{n} \sum_{\substack{\text{valid pixels} \\ \text{in binning Area}}} d_{02,lt} \qquad \text{(eq. 12b)}$$

Figure 15:
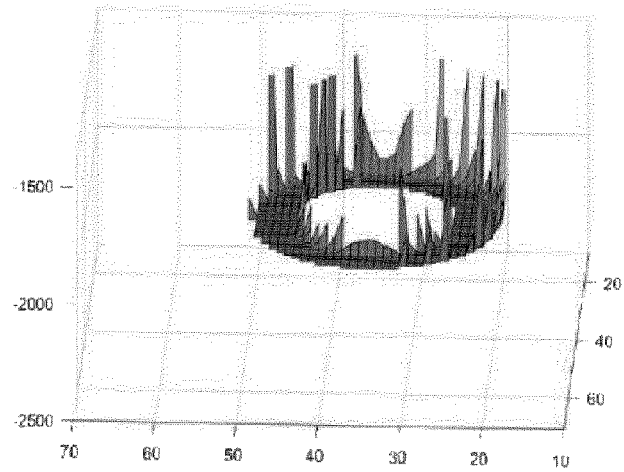
FIG. 15 is a first diagram showing the results of a depth measurement.
Figure 16:
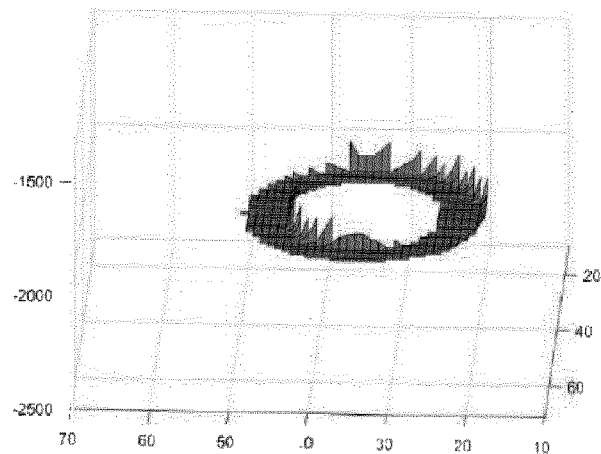
FIG. 16 is a second diagram showing the results of a depth measurement.
Figure 17:
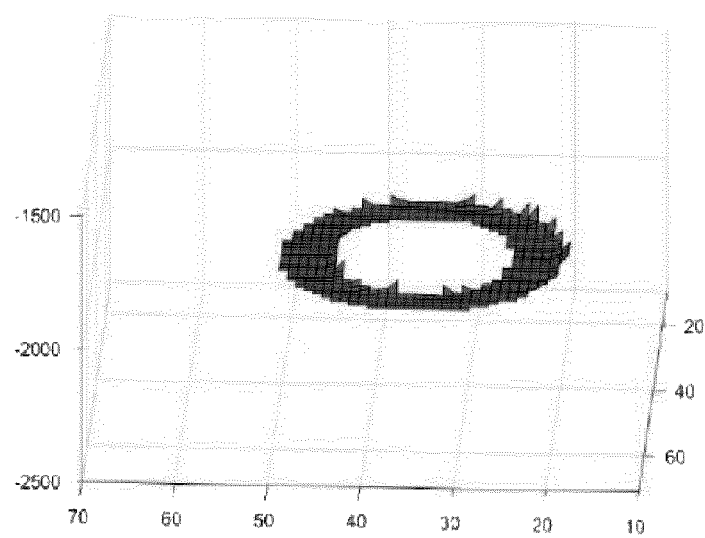
FIG. 17 is a third diagram showing the results of a depth measurement.

Afterwards, the binned depth value $D_b$ is determined based on the binned vector $r_b$. FIG. 15 shows the results for this simplified version. Comparing it to FIG. 7, significant improvement can be seen, but there are still outlier "flying pixels" having a depth outside of the depth range of the binned pixels 3. This problem is reduced if the vectors are assigned to the first and second group and are treated separately, as can be seen in FIG. 16. While FIG. 16 shows the results for a single integration time, FIG. 17 shows the results for two integration times, the first integration time being 4 times longer than the second integration time. In this case, the number of flying pixels is reduced to an all but negligible amount.

There are two possible alternatives to checking the in equation for the phase difference $\Delta\Phi$ at 220. First, one could check the following relation:

$$x_M y_P < x_P y_M \qquad \text{(eq. 13)}$$

If so, the method continues at 230, if not, it continues at 240. This condition is in relation to the slope of a vector (x, y) which is proportional to y/x. For the crucial case of distinguishing whether the angle between two vectors is smaller or larger than 180°, either one of the vectors has to be in quadrant 1 and the other in quadrant 3 or one vector is located in quadrant 2, the other in quadrant 4. For any other case, the distinction is trivial. If one vector is in quadrant 1 and the other vector is in quadrant 4, the angle between the two vectors is obviously larger than 180°. If one vector is in quadrant 2 and the other vector is in quadrant 3, the angle between the two vectors is obviously smaller than 180°.

Second, one could decide whether both $x_P$ and $x_M$ are negative, which means that the object depth is close to half of the ambiguity depth. If so, the method continues at 230, if not, it continues at 240.

Figure 18:
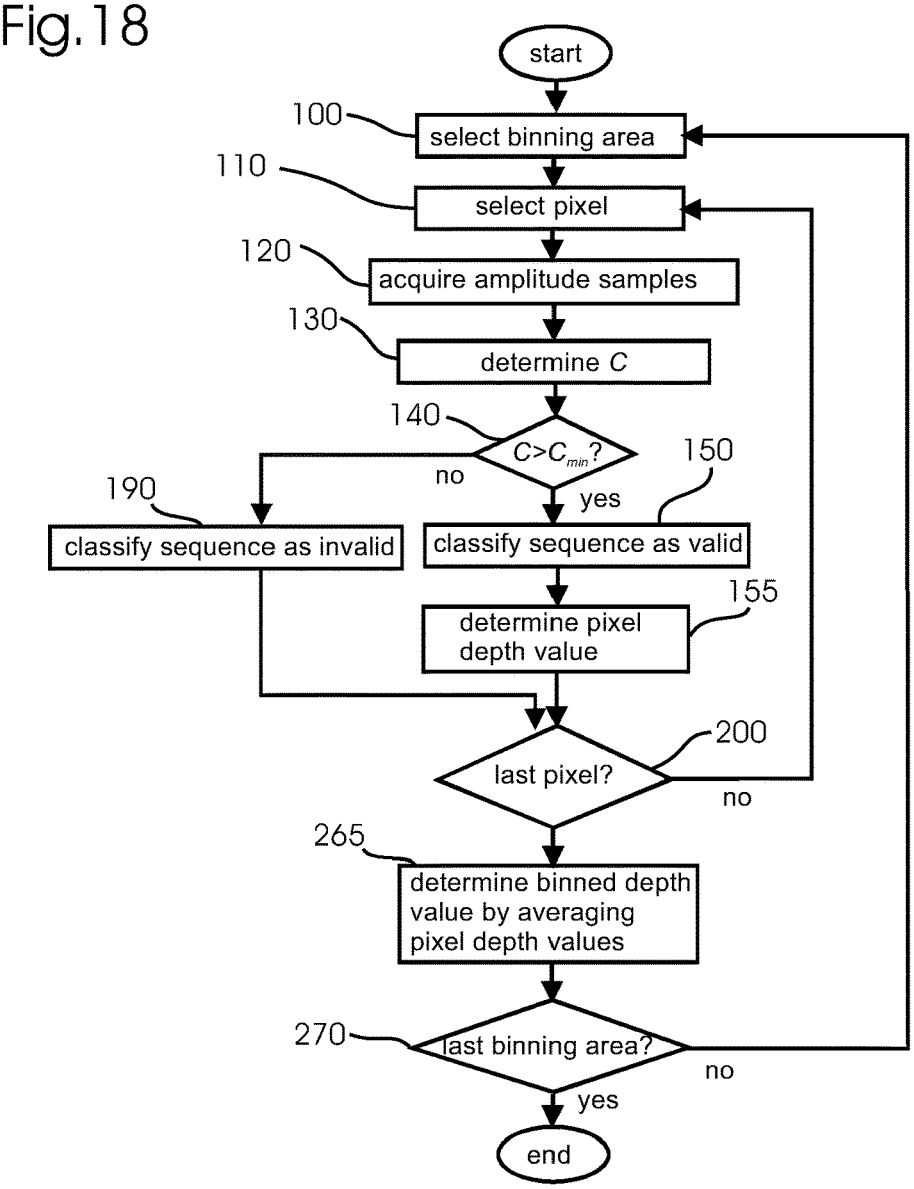
FIG. 18 is a flowchart illustrating a second embodiment of the inventive method.

FIG. 18 is a flowchart illustrating a second embodiment of the inventive method. Steps 100, 110, 120, 130 and 140 are identical to the first embodiment and will not be explained again for sake of brevity. If the sample sequence is classified as valid at 150, a pixel depth value D is determined at 155 according to eq.2 and eq.5. After all pixels 3 in the binning area 4 have been processed, the binned depth value $D_b$ is determined by averaging the pixel depth values D:

$$D_b = \frac{1}{N_{valid\ pixels}} \sum_{valid\ points} D \qquad \text{(eq. 8)}$$

Figure 19:
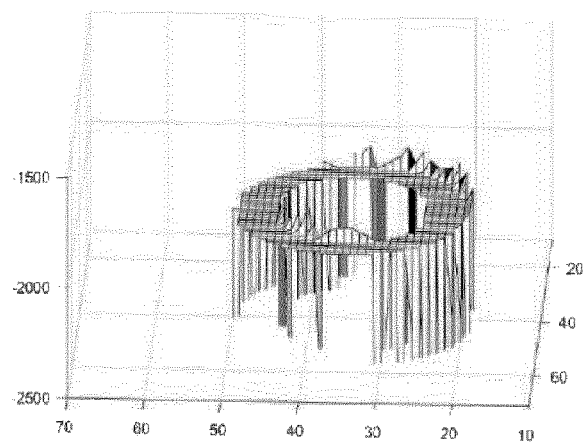
FIG. 19 is a fourth diagram showing the results of a depth measurement.

If multiple sample sequences are acquired for each pixel 3, a pixel depth value is determined for each sample sequence individually, and eq.8 has to be modified to average over all valid sample sequences of all pixels 3 or over all valid pixels 3 of all integration times. The result of calculating the binned depth value $D_b$ is a low-resolution depth image, where the binned depth value $D_b$ represents the arithmetic mean of the valid pixels in the respective binning area 4. FIG. 19 shows an example of a depth image computed in this embodiment. In comparison to FIG. 9, which shows the result of an averaging process without the distinction between valid and invalid pixels, the effect of flying pixels is reduced. It should be noted, though, that this second embodiment of the inventive method requires calculation of pixel depth values D for each valid pixel (and each sample sequence, where applicable) on the full high resolution image, which can lead to increased computational effort and/or increased memory requirements.

The invention claimed is:

1. A method for depth measurement with a time-of-flight camera using amplitude-modulated continuous light, the method comprising the steps of:
   acquiring for each of a plurality of pixels of a sensor array of the camera at least one sample sequence comprising at least four amplitude samples at a sampling frequency higher than a modulation frequency of the amplitude-modulated continuous light;
   determining for each sample sequence of each pixel a confidence value indicating a degree of correspondence of the amplitude samples with a sinusoidal time evolution of the amplitude; and
   determining for each of a plurality of binning areas, each of which comprises a plurality of pixels, a binned depth value based on the amplitude samples of sample sequences of pixels from the binning area, wherein the contribution of a sample sequence to the binned depth value depends on its confidence value.

2. A method according to claim 1, further comprising acquiring four amplitude samples at a sampling frequency four times higher than a modulation frequency of the amplitude-modulated continuous light.

3. A method according to claim 1, further comprising acquiring, for at least one pixel, a plurality of sample sequences.

4. A method according to claim 1, wherein the confidence value is determined by a relation of the amplitude samples of an individual sample sequence to each other.

5. A method according to claim 1, further comprising:
   Classifying each sample sequence as valid if the confidence value fulfills a predefined criterion and as invalid otherwise; and
   using the amplitude samples of a sample sequence to determine the binned depth value only if the sample sequence is valid.

6. A method according to claim 5, wherein the sample sequence is classified based on a relation of the confidence value to a first threshold value.

7. A method according to claim 1, wherein the binned depth value is determined based on a linear combination of amplitude samples of sample sequences of pixels from the binning area, wherein the contribution of each sample sequence to the linear combination depends on the confidence value of the respective sample sequence.

8. A method according to claim 1, wherein the binned depth value is determined by averaging pixel depth values of sample sequences of pixels—from the binning area, wherein a weight of each pixel depth value depends on the confidence value of the respective sample sequence of the respective pixel, an wherein the pixel depth value is determined based on the amplitude samples—of the sample sequence of the pixel.

9. A method for depth measurement with a time-of-flight camera using amplitude-modulated continuous light, the method comprising the steps of:
- acquiring for each of a plurality of pixels of a sensor array of the camera at least one sample sequence comprising at least four amplitude samples at a sampling frequency higher than a modulation frequency of the amplitude-modulated continuous light;
- determining for each sample sequence of each pixel a confidence value indicating a degree of correspondence of the amplitude samples with a sinusoidal time evolution of the amplitude;
- determining a first difference between a first amplitude sample and a third amplitude sample of a sample sequence of a pixel, and assigning sample sequences having a positive first difference to a first group and sample sequences having a negative first difference to a second group; and
- determining for each of a plurality of binning areas, each of which comprises a plurality of pixels, a binned depth value based on the amplitude samples of sample sequences of pixels from the binning area, wherein the contribution of a sample sequence to the binned depth value depends on its confidence value.

10. A method according to claim 9, further comprising:
- defining a vector having a second difference between a second amplitude sample and a fourth amplitude sample as a first component and the first difference as a second component;
- defining a first group vector which is a linear combination, based on the confidence values of the respective sample sequence, of the vectors of the first group and a second group vector which is a linear combination, based on the confidence value- of the respective sample sequence, of the vectors of the second group; and
- determining the binned depth value based on a phase difference between the second group vector and the first group vector.

11. A method according to claim 10, further comprising:
- determining the binned depth value based on both the first group vector and the second group vector if the phase difference is below a second threshold; and
- determining the binned depth value based on only one of the first group vector and the second group vector if the phase difference is above the second threshold.

12. A method according to claim 11, wherein the second threshold is 180°.

13. A method according to claim 11, wherein if the phase difference is above the second threshold, the binned depth value is determined based on the group vector of the group having more valid sample sequences.

14. A method according to claim 10, further comprising:
- determining the binned depth value based on both the first group vector and the second group vector if the first components of both group vectors are negative; and
- determining the binned depth value based on only one of the first group vector and the second group vector if at least one first component is positive.

* * * * *